(12) United States Patent
Raeckers

(10) Patent No.: US 7,897,095 B2
(45) Date of Patent: Mar. 1, 2011

(54) METHOD FOR MANUFACTURING A REINFORCED SHELL FOR FORMING COMPONENT PARTS FOR AIRCRAFT AND SHELL FOR COMPONENT PARTS FOR AIRCRAFT

(75) Inventor: Bernd Raeckers, Bremen (DE)

(73) Assignee: Airbus Operations GmbH, Hamburg (DE)

( * ) Notice: Subject to any disclaimer, the term of this patent is extended or adjusted under 35 U.S.C. 154(b) by 151 days.

(21) Appl. No.: 11/921,143

(22) PCT Filed: Jun. 7, 2006

(86) PCT No.: PCT/EP2006/062963

§ 371 (c)(1),
(2), (4) Date: Mar. 14, 2008

(87) PCT Pub. No.: WO2006/131532

PCT Pub. Date: Dec. 14, 2006

(65) Prior Publication Data

US 2009/0039208 A1 Feb. 12, 2009

(30) Foreign Application Priority Data

Jun. 7, 2005 (DE) .................. 10 2005 026 010

(51) Int. Cl.
*B29C 45/00* (2006.01)
(52) U.S. Cl. .................. 264/510; 156/285; 156/286; 156/242; 156/245; 244/119
(58) Field of Classification Search ............ 156/285, 156/286, 91, 245, 242; 244/119; 264/510
See application file for complete search history.

(56) References Cited

U.S. PATENT DOCUMENTS

| 4,464,874 | A | * | 8/1984 | Shea et al. ............. 52/204.593 |
| 4,782,864 | A | | 11/1988 | Abildskov |
| 5,618,606 | A | * | 4/1997 | Sherrick et al. ............. 428/113 |
| 5,939,013 | A | * | 8/1999 | Han et al. .................... 264/510 |
| 6,173,925 | B1 | * | 1/2001 | Mueller et al. ............. 244/219 |
| 6,306,239 | B1 | * | 10/2001 | Breuer et al. ............... 156/245 |
| 6,374,570 | B1 | * | 4/2002 | McKague, Jr. ............... 52/762 |
| 6,391,246 | B2 | * | 5/2002 | Shiraishi et al. ............. 264/510 |

(Continued)

FOREIGN PATENT DOCUMENTS

| DE | 19915083 | 4/2000 |
| EP | 1216816 | 6/2002 |

*Primary Examiner*—Timothy D Collins
*Assistant Examiner*—Justin Benedik
(74) *Attorney, Agent, or Firm*—Greer, Burns & Crain, Ltd.

(57) ABSTRACT

The invention concerns a method for manufacturing a shell, in particular a fuselage shell, a wing shell, a horizontal stabilizer shell or a vertical stabilizer shell, that is reinforced with a plurality of stiffening elements, for forming component parts for aircraft with high dimensional stability, wherein the stiffening elements and a shell skin are made with epoxy resin from at least partially cured carbon fiber reinforced semi-finished parts, the method comprising the following steps:
  positioning the stiffening elements on the shell skin,
  abutting connecting elements against the shell skin and the stiffening elements, and
  curing the connecting elements to form the shell.

The invention also concerns a shell, in particular a fuselage shell, a wing shell, a horizontal stabilizer shell or a vertical stabilizer shell, manufactured in accordance with the inventive method.

8 Claims, 2 Drawing Sheets

U.S. PATENT DOCUMENTS

| | | |
|---|---|---|
| 6,508,909 B1 * | 1/2003 | Cerezo Pancorbo et al. ................. 156/306.6 |
| 6,520,706 B1 * | 2/2003 | McKague et al. ........... 403/265 |
| 6,589,472 B1 * | 7/2003 | Benson et al. .............. 264/510 |
| 6,706,230 B2 * | 3/2004 | Sato et al. .................. 264/257 |
| 6,718,713 B2 * | 4/2004 | McKague et al. ........ 52/309.13 |
| 6,814,916 B2 * | 11/2004 | Willden et al. .............. 264/257 |
| 6,835,261 B2 * | 12/2004 | Schmidt ....................... 156/92 |
| 6,849,150 B1 * | 2/2005 | Schmidt ..................... 156/285 |
| 6,863,767 B2 * | 3/2005 | Bersuch et al. ............. 156/293 |
| 7,052,573 B2 * | 5/2006 | Pham et al. ................. 156/286 |
| 2003/0000641 A1 | 1/2003 | Schmidt |
| 2003/0041948 A1 * | 3/2003 | Bersuch et al. ............... 156/91 |
| 2003/0116267 A1 | 6/2003 | Sheahen et al. |
| 2003/0116567 A1 * | 6/2003 | Jozaki ..................... 220/23.83 |
| 2003/0190455 A1 * | 10/2003 | Burgess et al. .............. 428/119 |
| 2003/0196741 A1 * | 10/2003 | Burgess et al. ................ 156/92 |
| 2004/0065409 A1 * | 4/2004 | Lindsay et al. .............. 156/285 |
| 2007/0175171 A1 * | 8/2007 | Delgado et al. ............ 52/741.1 |

* cited by examiner

METHOD FOR MANUFACTURING A REINFORCED SHELL FOR FORMING COMPONENT PARTS FOR AIRCRAFT AND SHELL FOR COMPONENT PARTS FOR AIRCRAFT

FIELD OF THE INVENTION

The present invention relates to a method for manufacturing a shell, in particular a fuselage shell, a wing shell, a horizontal stabilizer shell or a vertical stabilizer shell, that is reinforced with a plurality of stiffening elements, for forming component parts for aircraft with high dimensional stability, wherein the stiffening elements and a shell skin are made with epoxy resin from at least partially cured carbon fiber reinforced semi-finished parts.

BACKGROUND OF THE INVENTION

Furthermore, the invention relates to a shell, in particular a fuselage shell, a wing shell, a horizontal stabilizer shell or a vertical stabilizer shell, manufactured in accordance with the inventive method, comprising a plurality of stiffening elements applied to a shell skin, for forming component parts for aircraft with high dimensional stability, wherein the stiffening elements and the shell skin are made with epoxy resin from at least partially cured carbon fiber reinforced semi-finished parts.

Due to their low weight and their high mechanical strength, carbon fiber reinforced epoxy resins are increasingly used to manufacture shells for load-bearing component parts of aircraft, such as fuselage cells, airfoil wings, horizontal stabilizers and vertical stabilizers. Such component parts of an aircraft are usually made of at least two shells, which are joined together. For example, a vertical stabilizer is made of mirror-symmetric (half-)shells that are joined together at their respective longitudinal edges.

The shells can be fabricated by several different methods, using so-called "prepregs". The term "prepreg" means a semi-finished part, made of a curable and carbon fiber reinforced epoxy resin. Such prepregs are ordinarily plate-shaped or strip-shaped, but they may also be sections or profiles with an L-shaped cross section, for example.

Prior to the curing, the prepregs are flexible, and therefore can be brought into virtually any desired shape. Only after curing is completed, the shells for forming component parts for aircraft, that are fabricated with these prepregs, attain their characteristic mechanical properties, such as their extremely high mechanical strength in combination with a very low weight. The curing of the shells made of these prepregs for forming the component parts is ordinarily performed in autoclaves at a temperature of between 120° C. and 180° C. and at pressures of up to 10 bar. The shelf-time of prepregs is limited due to continuously occurring cross-linking processes, and is ordinarily only between 10 and 30 days at room temperature. In the remainder of this description, the term "semi-finished parts" is used instead of the term "prepregs".

The shells are mainly formed of a shell skin and a plurality of stiffening elements and connecting angle pieces for reinforcement arranged thereon. Typically, two connecting angle pieces extending over the entire length of one stiffening element are arranged for the connection with the shell skin on both sides of each stiffening element. The shell skin, the connecting angle pieces as well as the stiffening elements are all made of semi-finished parts.

A number of manufacturing processes for manufacturing such shells from semi-finished parts are known from the state of the art:

In the so-called "co-curing" process, the entire shell, which includes in particular the shell skin, the stiffening elements and the connecting angle pieces, is enclosed by a single vacuum sack. This vacuum sack is then placed in an autoclave, thereby performing the curing of the entire shell. Thus, in the "co-curing" process, the curing process occurs in a single process step.

The main disadvantage of this process is that it requires a very elaborate apparatus for positioning and fixing the stiffening elements relative to the shell skin during the curing process, which leads to disproportionally high costs, in particular in the case of shells of large dimensions for forming complex component parts, such as airfoil wings, for example.

In the so-called "co-bonding" process, firstly, the stiffening elements are cured in a first step. Subsequently, the not-yet-cured shell skin is placed on the stiffening elements. During the final curing process of the shell skin, the stiffening elements are simultaneously joined with the shell skin. Also the reverse approach, namely first curing the shell skin and then curing the not-yet-cured stiffening elements together with the shell skin, thereby joining them, is also possible in a variation of the "co-bonding" process. In any case, the curing is performed in vacuum sacks placed in an autoclave. In accordance with these two processing methods, the curing process of the shell is performed in two steps.

The main disadvantage of this process variant is that the respectively not-yet-cured component, that is, the stiffening elements or the shell skin, for example, is subject to quality fluctuations, that cannot be ignored. These quality fluctuations may lead in particular to a disadvantageous fiber distribution in the resin matrix, to warping, as well as to pores and trapped air, which is caused primarily by setting movements of the cured component during the curing process.

In accordance with the so-called "secondary bonding" technique, the shell skin as well as the stiffening elements are cured in advance in two separate steps and then joined together by gluing.

The disadvantages of this approach include in particular the higher number of necessary processing steps as well as the necessary fitting precision of the stiffening elements, the connecting angle piece and the shell skin, which ordinarily cannot be ensured with shells of larger dimensions.

SUMMARY OF THE INVENTION

It is therefore an object of the present invention to avoid the disadvantages of the known processes as described above and to enable a simplified manufacture of shells with a shell skin and stiffening elements.

In accordance with one aspect of the present invention, a method for manufacturing a shell, in particular a fuselage shell, a wing shell, a horizontal stabilizer shell or a vertical stabilizer shell, that is reinforced with a plurality of stiffening elements, for forming component parts for aircraft with high dimensional stability, wherein the stiffening elements and a shell skin are made with epoxy resin from at least partially cured carbon fiber reinforced semi-finished parts, comprises the following steps:
  positioning the stiffening elements on the shell skin,
    abutting connecting elements against the shell skin and the stiffening elements, and
  curing the connecting elements to form the shell.

In accordance with a preferable embodiment of this method, an adhesive is applied to the connecting elements prior to the curing. This results in a better tolerance compensation between the shell skin and the stiffening elements. Moreover, a mechanically firmer connection between the stiffening elements and the shell skin as well as the connecting elements is achieved. The application of adhesive onto the connecting elements in conjunction with the inventive method is optional. Typically, a sufficiently firm connection of the stiffening elements to the shell skin can be achieved with connecting elements that are partially cured and therefore adaptable and capable of adhesion.

Due to the fact that the stiffening elements are connected to the shell skin by connecting elements that are cured afterwards, the inventive shell can be manufactured easily. Since the stiffening elements as well as the shell skin is at least partially cured and only the connecting elements need to be cured completely, the means for positioning the connecting elements on the shell skin can be simple. Due to the high inherent stability of the at least partially cured shell skin and the at least partially cured stiffening elements, the necessary positioning means or positioning devices may also be arranged outside the vacuum sack. Regardless of the shell skin and the positioning elements that have already been cured, a tolerance compensation is possible by means of the not-yet-cured connecting elements. Furthermore, with the inventive shell, the still flexible connecting elements allow the placement of stiffening elements in areas of the shell skin that comprise a thickened portion or the like. In this case, the stiffening elements should be provided with recesses.

DETAILED DESCRIPTION OF THE INVENTION

Figure 1:
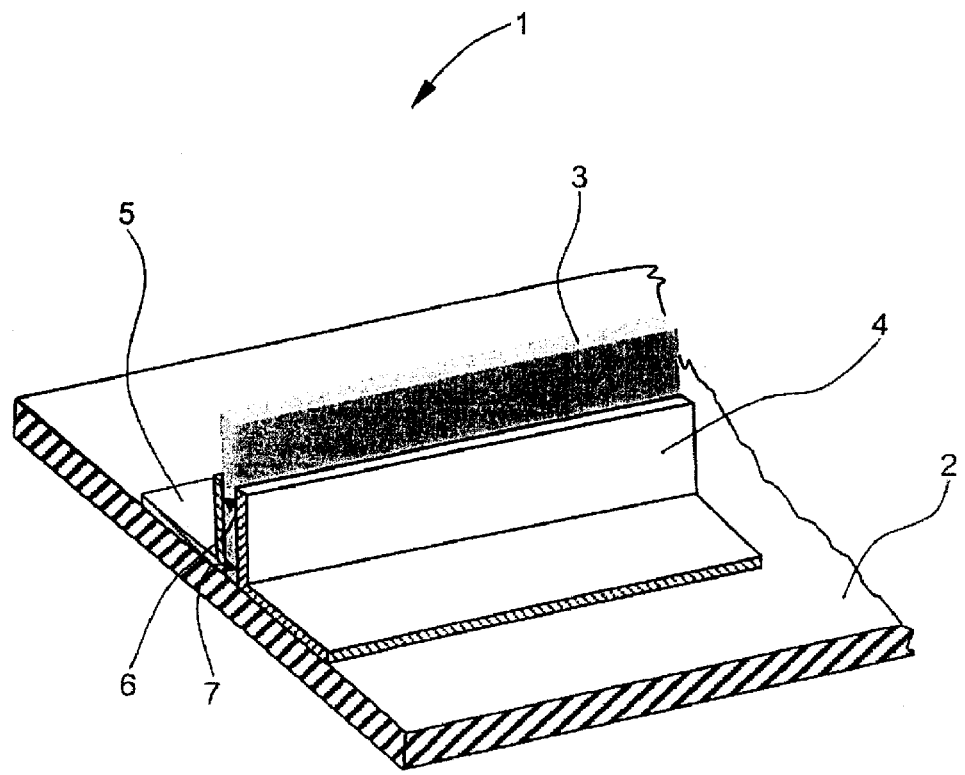
FIG. 1 shows a partial perspective view of a shell with a stiffening element that has been attached in accordance with a first embodiment of the inventive method.
Figure 2:
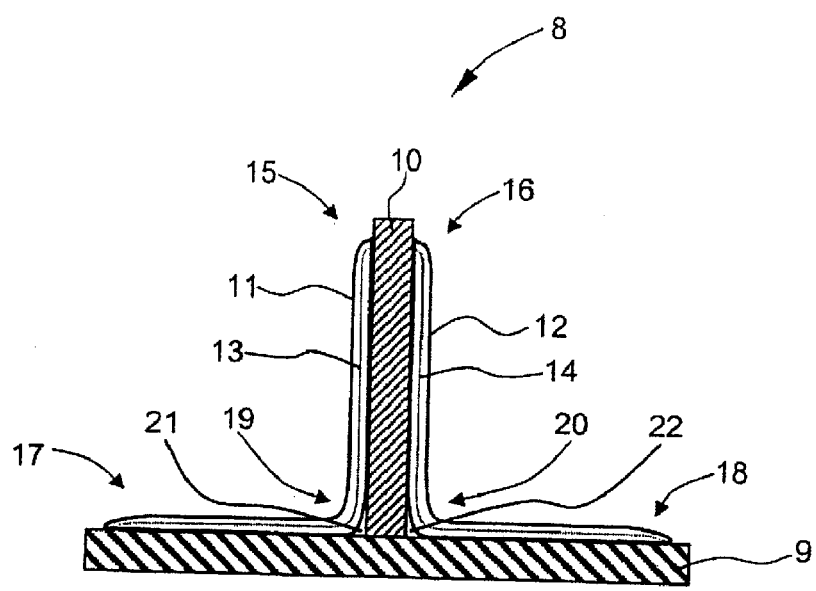
FIG. 2 shows a partial cross-sectional view of a shell according to a first embodiment of a stiffening element.
Figure 3:
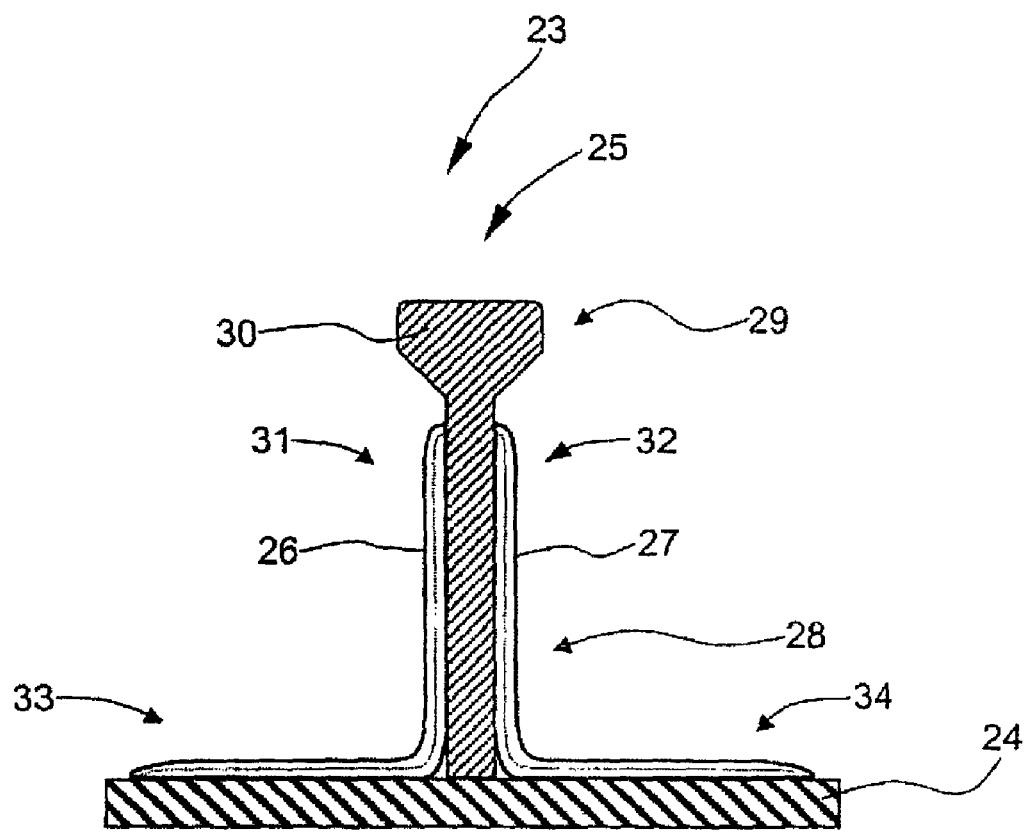
FIG. 3 shows a partial cross-sectional view of a shell according to a second embodiment of a stiffening element.

Referring to the FIGS. 1 to 3, the following is a explanation of an inventive method and an inventive shell.

FIG. 1 shows a partial perspective view of a shell with a stiffening element that has been attached in accordance with a first embodiment of the present invention.

A shell 1 comprises a shell skin 2, a stiffening element 3 as well as connecting elements 4 and 5. As shown in FIG. 1, the stiffening element 3 has a substantially rectangular cross-section. However, the stiffening element 3 may also have other cross-sectional shapes. The connecting elements 4 and 5 are connecting angle pieces with a substantially L-shaped cross-section. The shell skin 2, the stiffening element 3 and the connecting elements 4 and 5 are made of a plurality of semi-finished parts in the form of curable prepregs. The prepregs are carbon fiber reinforced sheet-shaped members, that are soaked or impregnated with a curable epoxy resin. In their non-cured state, virtually any geometric shape can be imparted on the prepregs. Thus, using prepregs as semi-finished parts, shell skins or stiffening elements with L-shaped cross-sections that are curved in two spatial directions can be formed, for example.

To manufacture the shell 1 in accordance with the inventive method, in a first step, the shell skin 2 and the stiffening element 3 are preferably completely cured. Alternatively, it is also possible to cure the shell skin and the stiffening element 3 only partially, so that a tolerance compensation of a larger extent is possible. Furthermore, it is possible to use a pre-fabricated, that is, already cured shell skin 2 and pre-fabricated and pre-cut stiffening elements 3. In this case, the first step can be eliminated without substitution.

In a second step, the stiffening element 3 is placed on the shell skin 2, whereupon in a third step, the connecting elements 4 and 5, which in accordance with the invention are only partially cured, are abutted preferably against both sides of the stiffening element 3. Due to the connecting elements 4 and 5 that in accordance with the present invention are at least not completely cured, a tolerance compensation between the shell skin 2 and the stiffening element 3 can be carried out. If necessary, the stiffening element 3 may be fixed prior to the placement in the vacuum sack by auxiliary means, that are not shown in the figures. After this, the entire arrangement is placed in a vacuum sack, which is disposed in an autoclave for curing.

In accordance with one variation of this process, it is not necessary to place the entire arrangement in a vacuum sack. Rather, an individual vacuum sack of smaller volume may be provided for each stiffening element 3, so that the risk of leakages is reduced and the overall risk of defective products is minimized. Furthermore, the curing of the arrangement may also be carried out without an autoclave, which makes it possible to reduce the manufacturing costs. For example, the curing may take place in a vacuum sack, which is placed in a simple furnace. Furthermore, the curing may also be accomplished by external heating to a temperature between 60° C. and 180° C.

In a fourth step of an inventive method, the connecting elements 4 and 5 are completely cured in the autoclave. After the complete curing of the connecting elements 4 and 5 in the autoclave, the shell 1 has been finished in accordance with the inventive method. Herein, the vacuum sack completely encloses the shell skin 2, the stiffening element 3 and the connecting elements 4 and 5. Due to the negative pressure in the vacuum sack, the connecting elements 4 and 5 are pressed firmly against the stiffening element 3 and the shell skin 2 by the ambient air pressure or the high positive pressure in the autoclave. The curing in the autoclave is performed at a temperature of between 120° C. and 180° C. and at a pressure of up to 10 bar. Simultaneously to the curing of the connecting elements 4 and 5, the unresolvable connection, that is, the cross-linking between the stiffening element 3, the connecting elements 4 and 5 and the shell skin 2 is performed. During the curing process, the shell skin 2 and the stiffening element 3 should be held at predetermined positions with respect to each other by retaining devices or clamping devices that are not shown in the drawings.

Typically, a retaining device or clamping device that is not shown in the figures, is necessary in order to position and fasten the stiffening elements 3 on the shell skin 2. Compared to manufacturing methods known in the art, the retaining device may be structurally less elaborate and lighter in weight since the shell skin 2 and the stiffening elements 3 have already been cured, so that they only need to be retained in their relative positions, but it is not necessary to retain a predetermined geometric shape of these components during the curing process. Furthermore, the connecting elements, which are not completely cured at the beginning of the curing process, are supported by the already cured stiffening element 3, so that no retaining devices are necessary within the vacuum sack that encloses the shell skin 2 and the stiffening element 3. Due to the light weight of the retaining device that is typically necessary in accordance with the inventive method, the mass that is to be heated up in the autoclave is reduced, which leads to additional savings in time and energy.

Nevertheless, due to the not yet completely cured connecting elements 4 and 5, the inventive method allows a sufficient tolerance compensation between the stiffening element 3 and the shell skin 2, to form a shell 1 with high dimensional stability, which cannot be attained by mere gluing of the cured stiffening elements 3 to the shell skin 2 ("secondary bonding"). Due to the arrangement of the retaining device outside of the vacuum sack, the process becomes simpler and shorter, which is very advantageous with regard to the limited shelf time of the prepregs or semi-finished parts, in particular in the case of large shells, such as wing shells or the like.

The retaining device may be for example a bar-shaped element, which is provided with a recess for accommodating the stiffening element 3 that is enclosed by the vacuum sack. By placing the retaining device onto the shell 2 in the vacuum sack with the stiffening element 3, a tilting of the stiffening element 3 with respect to the shell skin 2 during the curing process of the connecting elements 4 and 5 in the autoclave is avoided. Herein, the connecting elements 4 and 5 are pressed onto the stiffening element 3 and the shell skin 2 by the vacuum sack, so that a firm cross-linking and connection is possible. Since the shell skin 2 is already cured, only a light supporting device needs to be provided for supporting the shell skin 2. This supporting device is preferably adapted to the geometric shape of the shell skin 2 and may therefore be curved in up to two spatial directions. Alternative embodiments of the retaining device and/or the supporting device are also possible and are comprised by the basic principle of the invention.

Due to the fact that the stiffening element 3 is preferably already completely cured, it is typically sufficient to provide a retaining device only in a beginning area and an end area of the stiffening element 3. For the curing, the retaining device for the stiffening element 3 is then clamped to the supporting device for the shell skin 2 with clamping elements, such as screw clamps or the like. Due to the fact that the retaining device or the supporting device may be placed outside of the vacuum sack, the vacuum sack may be devised in a simpler manner, which reduces the probability of leaks.

If the shell skin 2 includes a larger number of stiffening elements 3, then a corresponding number of recesses for accepting the stiffening elements that are placed at suitable spacings of each other, should be provided in the bar-shaped element of the retaining devices. Furthermore, it is necessary to adapt a contour of the bar-shaped elements, with which the bar-shaped elements lie on the shell skin 2, to a surface geometry of the shell skin 2 that may be curved in two spatial directions, for example. Furthermore, abutting angle pieces for increasing the abutting area with respect to the stiffening elements may be provided on both sides of the recesses. Moreover, the retaining devices may be connected to each other, for example by stays or webs or the like.

Different to the planar configuration shown in FIG. 1, the shell skin 2 may also be curved, at least partially, in one or two spatial directions. Furthermore, a plurality of stiffening elements 3 may be arranged in virtually any geometric arrangement and/or with different lengths on the shell skin 2.

In order to achieve firmer cross-linking and therefore a mechanically even stronger joint between the stiffening element 3 and the connecting elements 4 and 5 or between the connecting elements 4 and 5 and the shell skin 2, it may be necessary to additionally apply and adhesive at least on two parts of the abutting areas 6 and 7 or the connecting elements 4 and 5. As an adhesive for this case, it is preferable to use a curably epoxy resin of the same type as that used for soaking or impregnating the semi-finished parts or prepregs. In general, however, the excess epoxy resin that is always present on the upper side due to the soaking of the semi-finished parts or prepregs is sufficient to manufacture a mechanically sufficiently strong joint between the stiffening element 3 and the shell skin 2.

FIG. 2 shows a partial cross-section of a shell with a stiffening element according to a first embodiment.

A shell 8 is made of a shell skin 9, a stiffening element 10 and the connecting elements 11 and 12. The stiffening element 10 has a substantially rectangular cross-section. The stiffening element 10 may also have a different cross-sectional shape. The connecting elements 11 and 12 have a substantially L-shaped cross-section, the legs of the connecting elements 11 and 12 having substantially the same length. The connecting elements 11 and 12 are reinforced with carbon fibers 13 and 14. The carbon fibers 13 and 14 run substantially parallel to a surface of the stiffening element 10 or a surface of the shell skin 9. In order to prevent peel-off of the connecting elements 4 and 5 in the end regions 15 to 18, the carbon fibers 13, 14 do not run parallel to the surface of the stiffening element 10 or the surface of the shell skin 9 in the end areas 15 to 18, but end at an angle of 5° to 90° with respect to those surfaces. The carbon fibers 13, 14 shown in the drawings are merely representative for a plurality of carbon fibers that run approximately parallel to the paper plane and that in conjunction with other carbon fibers that do not run parallel to the paper plane constitute the carbon fiber reinforcement of the semi-finished parts or the prepregs for forming the connecting elements 11, 12.

Gussets 21 and 22 are provided in a kink area 19, 20 of the connecting elements 11 and 12. In the area of the gussets 21, 22 there is no connection between the connecting elements 11, 12 and the shell skin 9 or the stiffening element 10. In order to avoid corrosion processes and/or condensation processes in the gussets 21 and 22, the gussets are filled with a suitable synthetic material, which may be additionally provided with fibers, after the inventive method has been completed. This synthetic material does not need to have any particular mechanical properties, since the gussets 21 and 22 typically do not fulfill a function of transmitting forces.

Alternatively, the gussets may be formed with a curable synthetic material, and particular an epoxy resin, a polyester resin or the like, into which additional reinforcement fibers ("rovings") for armature are embedded, so that also the gussets 21 and 22 may accept mechanical forces—at least to some extent.

In some regions, the shell skin 9 may also be provided with thickened portions for reinforcement. In this case, the stiffening element 10 should be provided with recesses at corresponding locations, so that the stiffening element 10 lies continuously and with its entire surface on the upper side of the shell skin 9. Regarding the connecting elements 11 and 12, special measures need to be taken during the application of stiffening elements in the area of thickened portions, since the connecting elements 11 and 12 still have sufficient flexibility prior to the during process, which ensures a continuous and substantially full-surface contact with the upper side of the shell skin 9 in the area of the thickened portions.

FIG. 3 shows a partial cross-sectional view of a shell, onto which a stiffening element is placed, in accordance with a second embodiment.

The shell 23 is provided with a shell skin 24, onto which at least one stiffening element 25 is attached with connecting elements 26 and 27 arranged on either side in accordance with an inventive method. In contrast to the stiffening element 10, the stiffening element 25 does not have a rectangular cross-section. In a lower region 28, the stiffening element 25 has a rectangular shape, whereas in an upper region 29, it is provided with a widening section 30. The widening section 30 enables a higher flexural rigidity of the stiffening element 25. Due to the widening section 30 arranged in the upper region 29, it may be necessary to make the legs 31, 32 shorter than the legs 33, 34 of the connecting elements 26, 29. Other details of FIG. 3 correspond to those shown in FIG. 2, so that their further description has been omitted.

In accordance with one aspect of an inventive method, a shell for forming component parts for aircraft is formed by placing, positioning and fastening already cured stiffening elements onto the shell that is also cured, by connecting the stiffening elements with at least not yet completely cured connecting elements to the shell skin by means of final curing of the connecting elements.

An inventive method allows the manufacture of shells of very large dimensions at significantly reduced costs in comparison to manufacturing processes known in the art.

What is claimed is:

1. A method for manufacturing a shell that is reinforced with a plurality of stiffening elements, for forming component parts for aircraft with high dimensional stability, wherein said stiffening elements and a shell skin are made with epoxy resin from at least partially cured carbon fiber reinforced semi-finished parts, the method comprising the following steps:
   positioning said stiffening elements on said shell skin,
   abutting connecting elements against said shell skin and said stiffening elements, and
   curing said connecting elements to form said shell, wherein said connecting elements are cured in a vacuum sack in an autoclave together with said shell skin and said stiffening elements, and wherein said stiffening elements are positioned and fixed with respect to said shell skin by means of a retaining device configured to hold the stiffening elements and the shell skin at predetermined positions with respect to each other, wherein the retaining device is located outside of said vacuum sack.

2. The method according to claim 1, wherein the shell is one of a fuselage shell, a wing shell, a horizontal stabilizer shell and a vertical stabilizer shell.

3. The method according to claim 1, wherein an adhesive is applied to said connecting elements prior to said curing thereof.

4. The method according to claim 1, wherein said connecting elements are angle sections.

5. The method according to claim 4, wherein said angle sections have an L-shaped cross section.

6. The method according to claim 1, wherein said connecting element or connecting elements are made of semi-finished parts.

7. The method according to claim 1, wherein said semi-finished parts are made of a fiber reinforced and curable synthetic material.

8. The method according to claim 7, wherein said semi-finished parts are made of carbon fiber reinforced epoxy resin.

* * * * *